(12) United States Patent
Okita

(10) Patent No.: US 8,366,310 B2
(45) Date of Patent: Feb. 5, 2013

(54) LIGHT SOURCE DEVICE, DISPLAY APPARATUS, AND OPTICAL MEMBER

(75) Inventor: Masami Okita, Tokyo (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 12/157,527

(22) Filed: Jun. 11, 2008

(65) Prior Publication Data

US 2009/0010025 A1 Jan. 8, 2009

(30) Foreign Application Priority Data

Jul. 3, 2007 (JP) ................................ P2007-174871

(51) Int. Cl.
*F21V 7/04* (2006.01)

(52) U.S. Cl. ........................ 362/633; 362/634; 362/97.4

(58) Field of Classification Search .................... 362/28, 362/29, 30, 33, 97.1–97.4, 125, 236, 237, 362/240, 244, 246, 249.01, 249.02, 249.11, 362/299, 300, 308, 309, 310, 311.01, 311.02, 362/311.11, 326, 330, 332, 333, 336, 367, 362/561, 632, 633, 800, 806, 812; 40/541, 40/542, 563, 564, 565, 570, 573, 581; 349/56–58, 349/61, 64, 65
See application file for complete search history.

(56) References Cited

U.S. PATENT DOCUMENTS

| | | | |
|---|---|---|---|
| 6,970,226 B2 * | 11/2005 | Yu et al. | 349/161 |
| 6,979,114 B2 * | 12/2005 | Kao | 362/633 |
| 7,161,642 B2 * | 1/2007 | Kim et al. | 349/58 |
| 7,223,003 B2 * | 5/2007 | Kim | 362/561 |
| 7,585,100 B2 * | 9/2009 | Aoki et al. | 362/634 |
| 7,710,514 B2 * | 5/2010 | Choi | 349/65 |
| 2005/0219438 A1 * | 10/2005 | Park | 349/58 |
| 2006/0187372 A1 * | 8/2006 | Kim et al. | 349/58 |
| 2008/0106671 A1 * | 5/2008 | Kim | 349/61 |
| 2008/0112184 A1 * | 5/2008 | Epstein et al. | 362/600 |

FOREIGN PATENT DOCUMENTS

| | | |
|---|---|---|
| JP | 08-327827 | 12/1996 |
| JP | 10-170915 | 6/1998 |
| JP | 2000-030522 | 1/2000 |
| JP | 2003-140148 | 5/2003 |
| JP | 2003-279988 | 10/2003 |
| JP | 2004-235103 | 8/2004 |
| JP | 2006-049062 | 2/2006 |
| JP | 2006-059606 | 3/2006 |
| JP | 2006-084813 | 3/2006 |

* cited by examiner

*Primary Examiner* — Hargobind S Sawhney
(74) *Attorney, Agent, or Firm* — Robert J. Depke

(57) ABSTRACT

An optical member is disposed between an optical sheet and a pair of middle chassis and top chassis that securely support an edge of an liquid crystal panel and an edge of the optical sheet. The optical member reflects light emitted from light-emitting diodes at high reflectivity so that an amount of light loss through the edge of the optical sheet is reduced. This allows for higher light utilization efficiency, thereby enhancing the brightness.

13 Claims, 6 Drawing Sheets

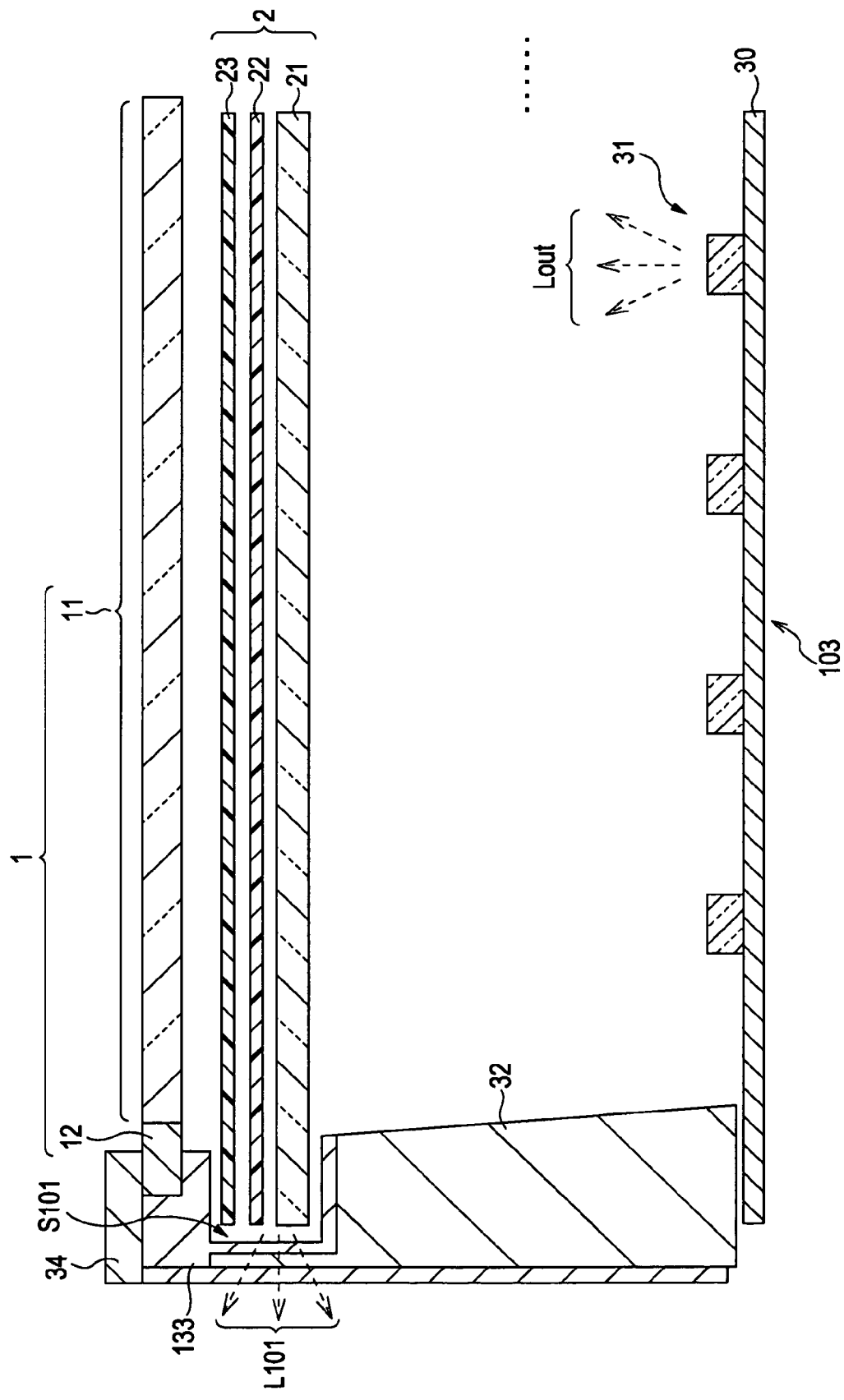

- ■ 1.050–1.060
- ☐ 1.040–1.050
- ■ 1.030–1.040
- ☐ 1.020–1.030
- ☐ 1.010–1.020
- ■ 1.000–1.010
- ■ 0.990–1.000

- ☐ 1.050–1.060
- ■ 1.040–1.050
- ☐ 1.030–1.040
- ■ 1.020–1.030
- ☐ 1.010–1.020
- ☐ 1.000–1.010
- ■ 0.990–1.000
- ■ 0.980–0.990

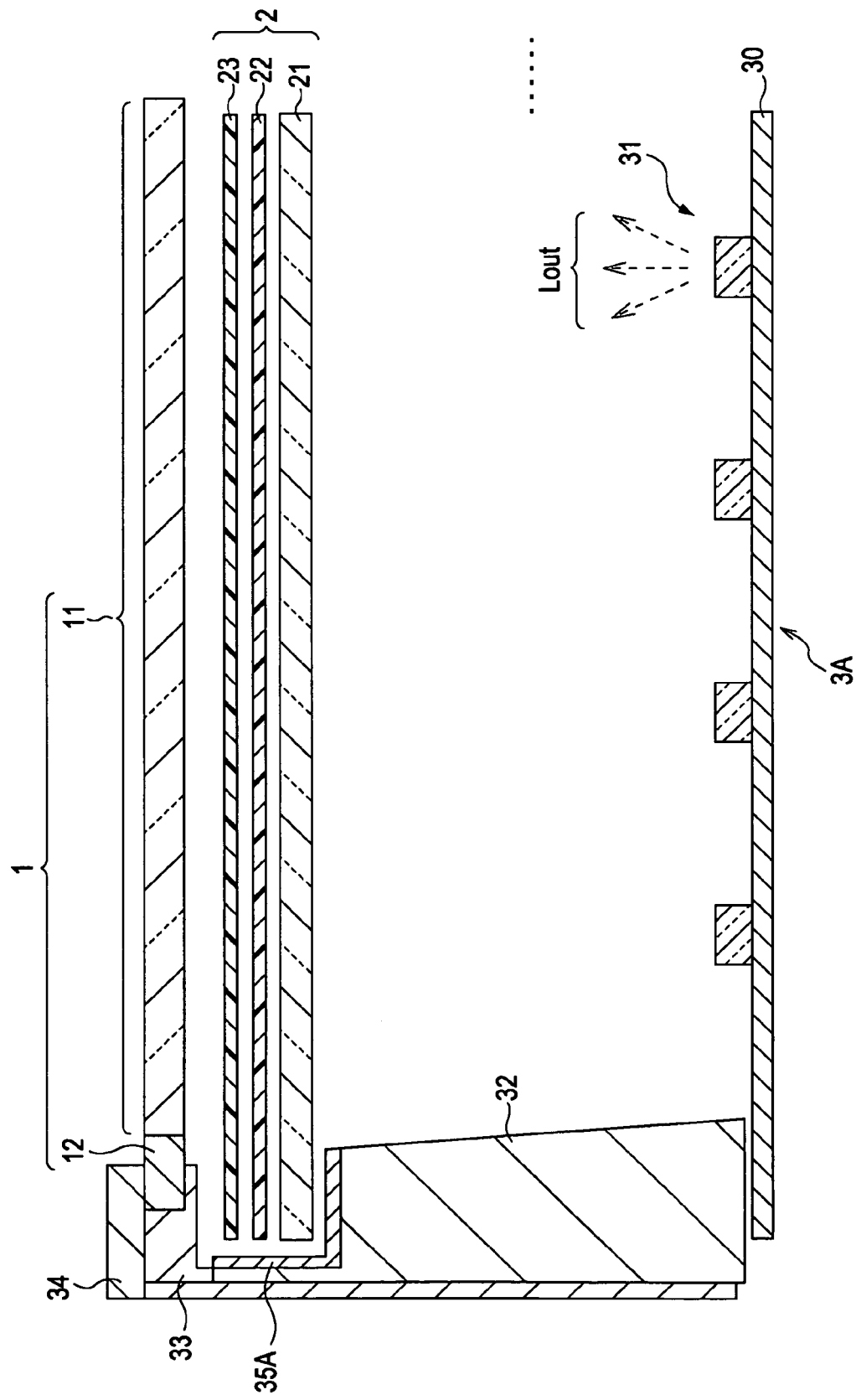

LIGHT SOURCE DEVICE, DISPLAY APPARATUS, AND OPTICAL MEMBER

CROSS REFERENCES TO RELATED APPLICATIONS

The present invention contains subject matter related to Japanese Patent Application JP 2007-174871 filed in the Japanese Patent Office on Jul. 3, 2007, the entire contents of which are incorporated herein by reference.

BACKGROUND OF THE INVENTION

1. Field of the Invention

The present invention relates to a light source device having a plurality of light source portions, to a display apparatus equipped with such a light source device as a backlight light source, and to an optical member suitable for such a device and such an apparatus.

2. Description of the Related Art

Liquid crystal display apparatuses are advantageous in that they have low power consumption and a space-saving design, and can be manufactured at low cost. In recent years, liquid crystal display apparatuses with these features are replacing cathode ray tubes (CRT) which were mainstream display apparatuses in the past.

Liquid crystal display apparatuses can be classified into several types in terms of their illumination techniques used for displaying images. One representative type is a transmissive liquid crystal display apparatus that performs image display by utilizing a light source (backlight light source) disposed behind a liquid crystal panel. An example of a transmissive liquid crystal display apparatus is disclosed in Japanese Unexamined Patent Application Publication No. 2003-279988.

Generally, a backlight light source device contained in a transmissive liquid crystal display apparatus includes a cold cathode fluorescent lamp (CCFL). On the other hand, as eco-friendly mercury-free light source devices are becoming in greater demand in recent years, light source devices that use light-emitting diodes (LEDs) in place of CCFLs are expected to increase.

SUMMARY OF THE INVENTION

In a backlight light source device of related art, an optical sheet for enhancing the brightness of the light from the backlight light source device is disposed between a light-emitting unit including, for example, CCFL or LED and a liquid crystal display panel, the optical sheet including, for example, a diffusion plate, a diffusion sheet, and/or a brightness-enhancement film.

However, since components with a low reflectivity (of about 50%), such as a middle chassis, are disposed near a side surface and peripheral region of the optical sheet, a portion of the light emitted from the light-emitting unit leaks through these components so as to undesirably become absorbed. This results in reduced light utilization efficiency. Thus, the overall brightness of the light source device becomes lower, and particularly, the brightness at the peripheral region becomes significantly reduced. This leads to non-uniformity in brightness (creates variation in brightness), resulting in lower display quality.

It is desirable to provide a light source device having high light utilization efficiency to achieve enhanced brightness, a display apparatus equipped with such a light source device, and an optical member included in the light source device and the display apparatus.

According to an embodiment of the present invention, there is provided a light source device that includes a light-emitting unit, an optical sheet disposed between the light-emitting unit and the display panel, a support portion that supports an edge of the display panel and an edge of the optical sheet, and an optical member. The optical member is at least partially disposed between the support portion and the optical sheet and has a reflectivity that is higher than that of the support portion with respect to light emitted from the light-emitting unit.

According to an embodiment of the present invention, there is provided a display apparatus that includes a display panel and the aforementioned light source device as a backlight light source for the display panel.

According to an embodiment of the present invention, there is provided an optical member used in the aforementioned light source device. The optical member is at least partially disposed between the support portion and the optical sheet and has a reflectivity that is higher than that of the support portion with respect to light emitted from the light-emitting unit.

In the light source device, the display apparatus, and the optical member according to the above embodiments of the present invention, the optical member at least partially disposed between the optical sheet and the support portion supporting the edges of the display panel and optical sheet has a high reflectivity for reflecting the light emitted from the light-emitting unit. Consequently, an amount of light loss through the edges of the optical sheet can be reduced, as compared to the case where the light is reflected at the support portion. This allows for higher light utilization efficiency, thereby enhancing the brightness.

BRIEF DESCRIPTION OF THE DRAWINGS

FIG. 3 is a cross-sectional view showing a relevant part of a display apparatus according to a comparative example;

FIG. 5 is a cross-sectional view showing a relevant part of a display apparatus according to a modification of the present embodiment.

DESCRIPTION OF THE PREFERRED EMBODIMENTS

Embodiments of the present invention will now be described with reference to the drawings.

Figure 1:
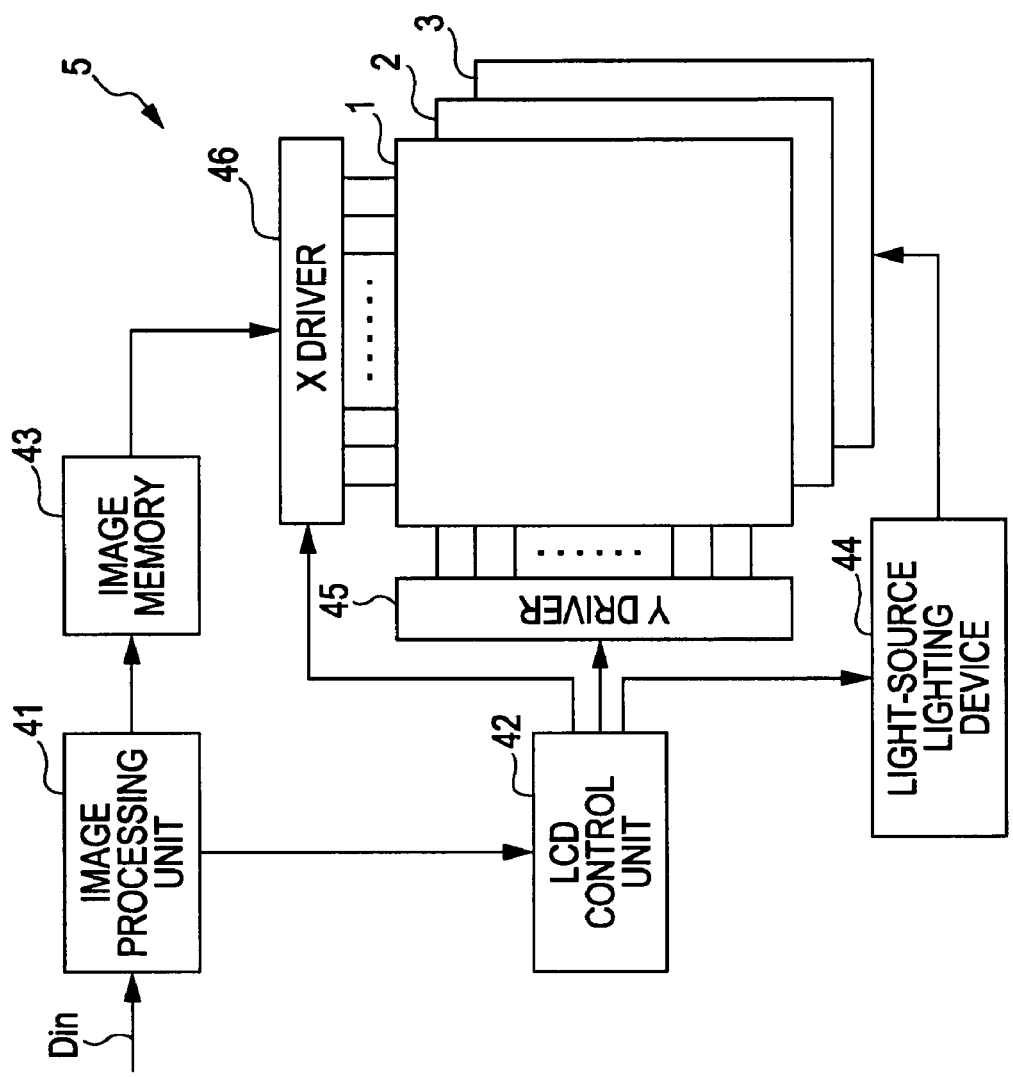
FIG. 1 is a block diagram of an entire display apparatus according to an embodiment of the present invention.

FIG. 1 is a block diagram of an entire display apparatus (liquid crystal display apparatus 5) equipped with a light source device (light source device 3) according to an embodiment of the present invention. The liquid crystal display apparatus 5 includes a liquid crystal display (LCD) panel 1, an optical sheet 2, the light source device 3, an image processing unit 41 that performs signal processing on an input image signal $D_{in}$, an LCD control unit 42 that controls, for example, the LCD panel 1, an image memory 43 that stores an image signal, a light-source lighting device 44 that controls the lighting operation of the light source device 3, and a Y driver (gate driver) 45 and an X driver (data driver) 46 that drive the LCD panel 1.

Figure 2:
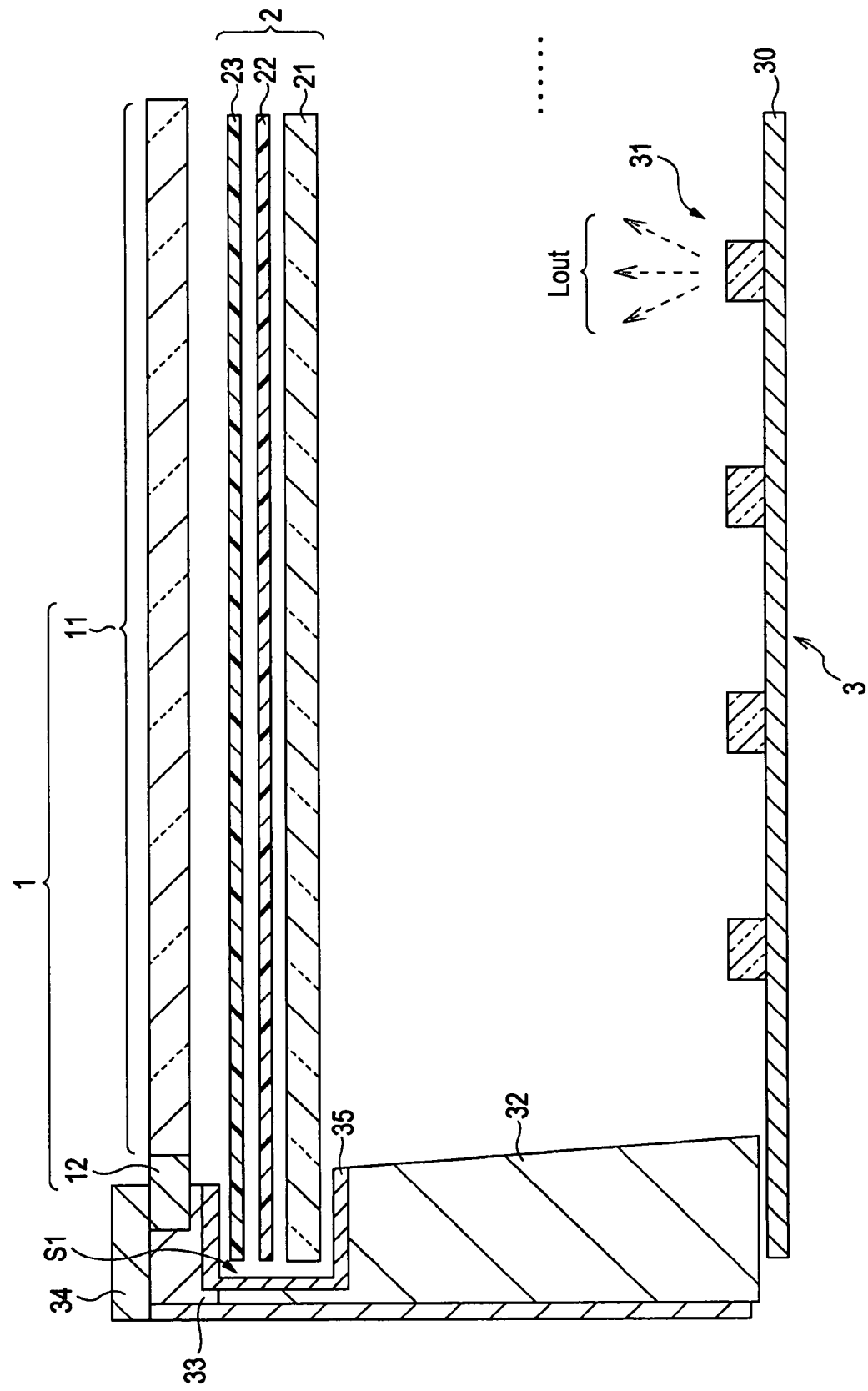
FIG. 2 is a cross-sectional view showing a relevant part of the display apparatus shown in FIG. 1.

FIG. 2 is a cross-sectional view showing a relevant part of the liquid crystal display apparatus 5 (specifically, the LCD panel 1, the optical sheet 2, and the light source device 3). The liquid crystal display apparatus 5 has a so-called direct-lighting type backlight structure in which a plurality of light-emitting diodes (LEDs) 31 are disposed below the LCD panel 1 and the optical sheet 2. In other words, the light source device 3 is of a direct-lighting type.

The LEDs 31 serve as a light-emitting unit that emits light $L_{out}$. The LEDs 31 are arranged substantially at regular intervals on a substrate 30 composed of, for example, a glass epoxy material. The LEDs 31 are composed of, for example, a semiconductor material containing gallium arsenide or gallium nitride as a main component.

The optical sheet 2 is provided for enhancing the brightness of the light source device 3 based on the light $L_{out}$ emitted from the LEDs 31, and has a multilayer structure constituted by a diffusion plate 21, a diffusion sheet 22, and a brightness-enhancement film 23 stacked in that order from the LED 31 side.

The diffusion plate 21 and the diffusion sheet 22 are for diffusing the light $L_{out}$ emitted from the LEDs 31 in order to provide a uniform distribution of brightness. The diffusion plate 21 is composed of, for example, an acrylic or polycarbonate material, whereas the diffusion sheet 22 is composed of, for example, a polyester material. The diffusion plate 21 has a thickness of about 2 mm, whereas the diffusion sheet 22 has a thickness of about 0.3 mm.

The brightness-enhancement film 23 adjusts the orientation of the light diffused by the diffusion plate 21 and the diffusion sheet 22 so as to enhance the front brightness of the LCD panel 1. The brightness-enhancement film 23 is composed of, for example, a polyester or acrylic material. The brightness-enhancement film 23 has a thickness of about 150 µm.

The LCD panel 1 serves as a transmissive liquid crystal panel and has a pair of glass substrates (not shown) with a liquid crystal layer (not shown) interposed therebetween. These glass substrates have polarization plates (not shown) on the outer surfaces thereof. The inner surface (i.e. liquid-crystal-layer facing surface) of the glass substrate closer to the optical sheet 2 has arranged thereon a plurality of pixel electrodes (not shown) in a matrix. The inner surface of the glass substrate farther from the optical sheet 2 has disposed thereon a common transparent electrode (counter electrode, not shown). In addition, the inner surface of the glass substrate farther from the optical sheet 2 also has color filters (not shown) for blue (B), green (G), and red (R) colors at positions facing the corresponding pixel electrodes. The LCD panel 1 has a display region (effective pixel region) 11 where an image is displayed on the basis of an input image signal $D_{in}$ and a non-display region (non-effective pixel region) 12 disposed around the edges of the display region 11 and where an image is not displayed.

At the non-display region 12 of the LCD panel 1, the edges of the optical sheet 2 and the LCD panel 1 are securely supported by a middle chassis 33 and a top chassis 34. The middle chassis 33 is supported by a base portion 32. The middle chassis 33 and the top chassis 34 have surfaces that are composed of a material having low reflectivity, such as iron (Fe). When Fe is used, the reflectivity is approximately 50%.

The middle chassis 33 and the top chassis 34 correspond to a specific example of a support portion according to an embodiment of the present invention.

An optical member 35 is disposed between the optical sheet 2 and the pair of middle chassis 33 and top chassis 34. Specifically, in a region corresponding to the non-display region 12 of the LCD panel 1 (i.e. the entire peripheral region of the LCD panel 1), the optical member 35 is disposed so as to cover a side surface of the optical sheet 2, a surface of the optical sheet 2 that faces towards the LEDs 31 (i.e. the lower surface), and a surface of the optical sheet 2 that faces away from the LEDs 31 (i.e. the upper surface). The surface of the optical member 35 facing towards the optical sheet 2 is a mirror surface or a diffuse reflector and has a higher reflectivity than the middle chassis 33 and the top chassis 34 with respect to the light $L_{out}$ emitted from the LEDs 31. This surface of the optical member 35 facing towards the optical sheet 2 is made of a material containing aluminum (Al), which has a reflectivity of about 90%, or silver (Ag), which has a reflectivity of about 95%.

The advantages of the liquid crystal display apparatus 5 will now be described. First, the basic operation of the liquid crystal display apparatus 5 will be described with reference to FIGS. 1 and 2.

Referring to FIG. 1, when the image processing unit 41 receives an input image signal $D_{in}$, the image processing unit 41 separates this input image signal $D_{in}$ into an image data signal and a synchronization signal. The image processing unit 41 transfers the image data signal for X-direction (horizontal scanning direction) to the image memory 43 for each scanning line, and sends the synchronization signal to the LCD control unit 42. The LCD control unit 42 generates control signals for controlling the Y driver 45 and the X driver 46, and sends these control signals to the Y driver 45 and the X driver 46. The LCD control unit 42 also generates a control signal for controlling the light-source lighting device 44, and sends the control signal to the light-source lighting device 44.

The light-source lighting device 44 controls the lighting operation of the light source device 3 on the basis of the control signal received from the LCD control unit 42. The light emitted from the light source device 3 is optically processed by the optical sheet 2, and is projected onto the back face of the LCD panel 1. In the LCD panel 1, the Y driver 45 selects the horizontal scanning lines used for image display in a one-by-one fashion, and the X driver 46 controls the amount of transmission light in accordance with a value stored in the image memory 43. Consequently, an image according to the input image signal $D_{in}$ is displayed on the LCD panel 1 at a position corresponding to the synchronization signal contained in the input image signal $D_{in}$.

Referring to FIG. 2, in the light source device 3, the light $L_{out}$ emitted from the LEDs 31 enters the optical sheet 2 as white light. While passing through the optical sheet 2, this white light is subjected to various optical processes by the optical sheet 2, the optical processes including uniformizing the brightness of the light, adjusting the orientation of the light in the front direction, and implementing s-p polarization conversion. Subsequently, the white light enters the LCD panel 1. In the LCD panel 1, the transmission brightness is modulated for each pixel in accordance with an image signal received from an image processing circuit (not shown). At the same time, the B, G, R color filters (not shown) of the LCD panel 1 selectively transmit a B light component, a G light component, and an R light component, respectively, of the white light received from the optical sheet 2, whereby the LCD panel 1 can perform color image display.

Figure 4A:
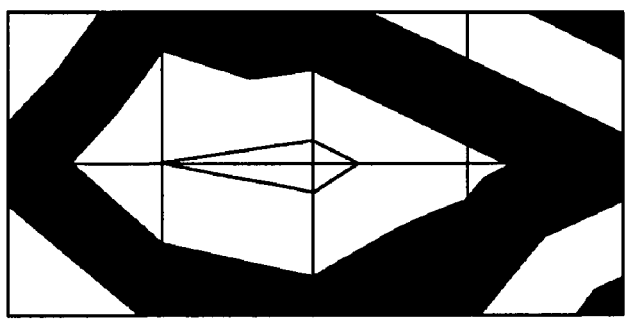
FIGS. 4A and 4B are characteristic diagrams for explaining brightness characteristics of the present embodiment and the comparative example.
Figure 4B:
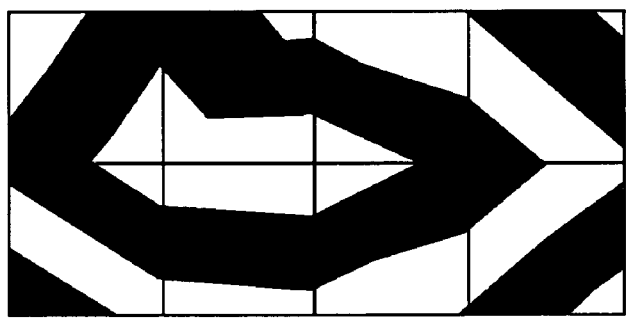

The advantages of the present embodiment will be described below with reference to FIGS. 2 to 4B while comparing the brightness characteristics (i.e. brightness characteristics at various positions of the LCD panel 1 shown in FIGS. 4A and 4B) according to the present embodiment (FIG. 2) with the brightness characteristics according to a liquid crystal display apparatus of related art as a comparative example (FIG. 3). FIG. 4A shows the brightness characteristics according to the present embodiment obtained in the case where the surface of the optical member 35 facing towards the optical sheet 2 is a diffuse reflector. FIG. 4B shows the brightness characteristics obtained in the case where the surface of the optical member 35 facing towards the optical sheet 2 is a mirror surface. In FIGS. 4A and 4B, the brightness characteristics obtained in the present embodiment are expressed as ratio values with respect to a brightness value of 1 given at each position in the comparative example.

In the comparative example shown in FIG. 3, a light source device 103 does not have the optical member 35 according to the present embodiment shown in FIG. 2, but has a middle chassis 133 that is disposed so as to cover a side surface of the optical sheet 2, a surface of the optical sheet 2 that faces towards the LEDs 31 (i.e. the lower surface), and a surface of the optical sheet 2 that faces away from the LEDs 31 (i.e. the upper surface). Consequently, in the comparative example, a portion of the light $L_{out}$ emitted from the LEDs 31 leaks through the middle chassis 133 and the top chassis 34 that have a low reflectivity (of about 50%) so as to undesirably become absorbed. This results in reduced utilization efficiency of the light $L_{out}$. Thus, the overall brightness of the light source device 103 becomes lower, and particularly, the brightness at the peripheral region becomes significantly reduced. This leads to non-uniformity in brightness (creates variation in brightness), thus reducing the display quality of the liquid crystal display apparatus.

In contrast, in the present embodiment shown in FIG. 2, the optical member 35 is disposed between the optical sheet 2 and the pair of middle chassis 33 and top chassis 34 that securely support the edges of the LCD panel 1 and the optical sheet 2. Since the optical member 35 has higher reflectivity for reflecting the light $L_{out}$ emitted from the LEDs 31 than the middle chassis 133 and the top chassis 34 in the comparative example, an amount of loss of light $L_{out}$ through the edges of the optical sheet 2 can be reduced, as compared to the comparative example.

Accordingly, as is apparent from FIG. 4A (corresponding to the case where the surface of the optical member 35 facing towards the optical sheet 2 is a diffuse reflector) and FIG. 4B (corresponding to the case where the surface of the optical member 35 facing towards the optical sheet 2 is a mirror surface), the brightness of the light source device 3 is enhanced substantially over the entire LCD panel 1 relative to the brightness of the light source device 103 according to the comparative example (the ratio values of the brightness shown in FIGS. 4A and 4B are greater than 1 substantially over the entire LCD panel 1), and the peripheral region shows a higher value than that in the central region. Since the brightness is significantly low particularly in the peripheral region in the comparative example, it is apparent that there is remarkable enhancement in brightness particularly in the peripheral region of the LCD panel 1 according to the present embodiment. This means that the uniformity of the brightness is improved in the present embodiment. Comparing the brightness characteristics shown in FIG. 4A with the brightness characteristics shown in FIG. 4B, the two are substantially the same, which implies that the degree of enhancement in brightness and the degree of improvement in the uniformity of the brightness are substantially the same whether the surface of the optical member 35 facing the optical sheet 2 be a diffuse reflector or a mirror surface.

As described above, in the present embodiment, the optical member 35 is disposed between the optical sheet 2 and the pair of middle chassis 33 and top chassis 34 that securely support the edges of the LCD panel 1 and the optical sheet 2. Since the optical member 35 has high reflectivity for reflecting the light $L_{out}$ emitted from the LEDs 31, an amount of loss of light $L_{out}$ through the edges of the optical sheet 2 can be reduced. This allows for higher utilization efficiency of the light $L_{out}$, thereby enhancing the brightness.

As described above, in the region corresponding to the non-display region 12 of the LCD panel 1, the optical member 35 covers the surface of the optical sheet 2 that faces away from the LEDs 31 (i.e. the upper surface) in addition to the side surface of the optical sheet 2 and the surface of the optical sheet 2 that faces towards the LEDs 31 (i.e. the lower surface). Consequently, an amount of loss of light $L_{out}$ through the edges of the optical sheet 2 can be reduced as compared to that in a modification to be described hereinafter (in FIG. 5 where an optical member is disposed so as to cover only the side surface of the optical sheet 2 and the surface of the optical sheet 2 that faces towards the LEDs 31). Accordingly, this allows for even higher utilization efficiency of the light $L_{out}$, thereby further enhancing the brightness.

Since the optical member 35 is disposed along the entire peripheral region of the LCD panel 1, an amount of loss of light $L_{out}$ through the edges of the optical sheet 2 can be reduced as compared to that in a modification to be described hereinafter (in FIG. 6B where optical members are only disposed at parts of the peripheral region of the LCD panel 1). Accordingly, this allows for even higher utilization efficiency of the light $L_{out}$, thereby further enhancing the brightness.

Although an embodiment of the present invention has been described above, the present invention is not limited to the above embodiment, and various modifications are permissible.

For example, although the above embodiment is directed to a case where the optical member 35 is disposed so as to cover the side surface of the optical sheet 2, the surface of the optical sheet 2 that faces towards the LEDs 31 (i.e. the lower surface), and the surface of the optical sheet 2 that faces away from the LEDs 31 (i.e. the upper surface) within the region corresponding to the non-display region 12 of the LCD panel 1, an alternative configuration as shown in, for example, FIG. 5 is also permissible. Specifically, a light source device 3A shown in FIG. 5 is configured such that, in the region corresponding to the non-display region 12 of the LCD panel 1, an optical member 35A covers only the side surface of the optical sheet 2 and the surface of the optical sheet 2 that faces towards the LEDs 31.

Figure 6A:
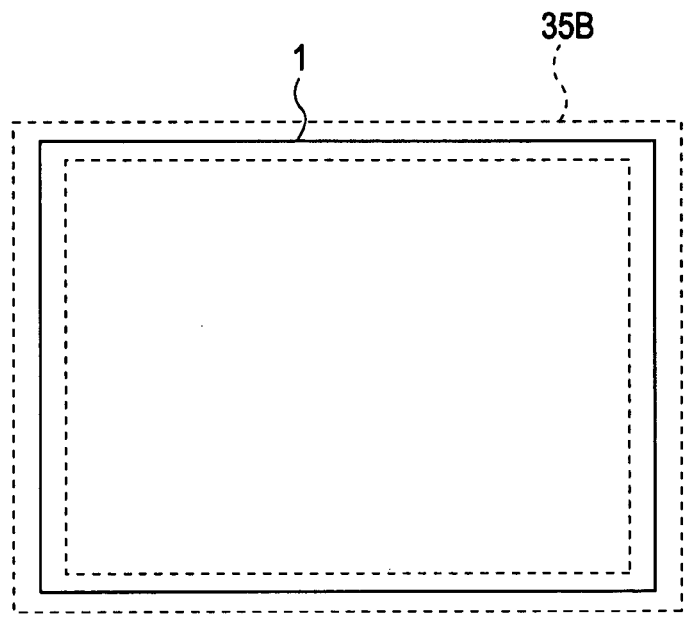
FIGS. 6A and 6B are schematic plan views showing different arrangement examples for an optical member or members according to an embodiment of the present invention.
Figure 6B:
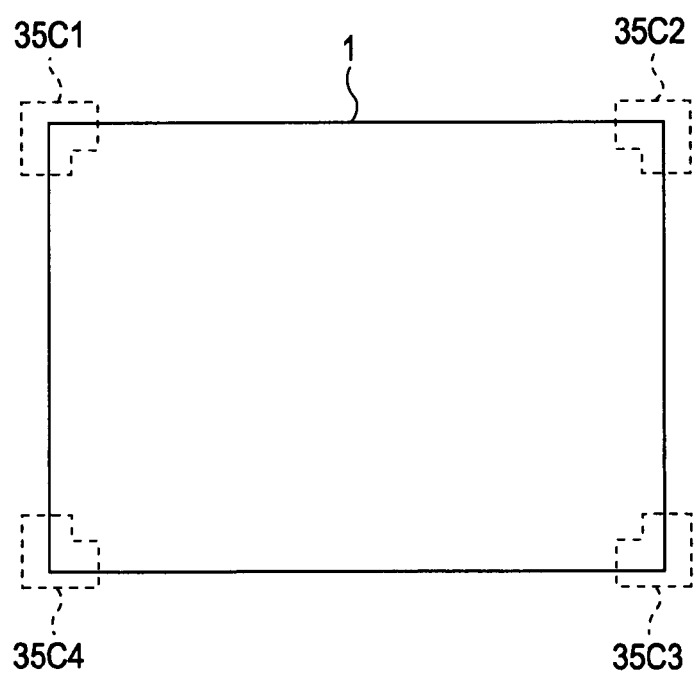

Furthermore, although the above embodiment is directed to a case where the optical member is disposed along the entire peripheral region of the LCD panel 1, like an optical member 35B shown in FIG. 6A, an alternative configuration as shown in, for example, FIG. 6B is also permissible. Specifically, four optical members 35C1 to 35C4 may be disposed respectively at the four corners of the peripheral region of the LCD panel 1. As mentioned above, in the related art in which an optical member is not provided, the brightness is significantly low particularly in the peripheral region. With the configuration shown in FIG. 6B, the brightness in the peripheral region of the LCD panel 1 can be selectively enhanced.

Although the above embodiment is directed to a case where the optical member 35 is disposed between the pair of middle chassis 33 and top chassis 34 and the optical sheet 2, the optical member 35 may alternatively be disposed on the surfaces of the middle chassis 33 and the top chassis 34 that are proximate to the optical sheet 2.

Although the liquid crystal display apparatus explained in the above embodiment has a light source device 3 of a so-called direct-lighting type as shown in FIG. 2, the liquid crystal display apparatus may alternatively have a light source device of a so-called side-edge type. In that case, the light source device may have the LEDs 31 arranged along the side surfaces of the LCD panel 1 and optical sheet 2, and be equipped with a light-guiding portion (not shown) that guides the light $L_{out}$ emitted from the LEDs 31 towards the optical sheet 2.

Although the light-emitting unit that emits light $L_{out}$ in the above embodiment is defined by LEDs, the light-emitting unit may alternatively be defined by, for example, a cold cathode fluorescent lamp (CCFL).

Although the above embodiment is directed to a liquid crystal display apparatus that has an LCD panel and a light source device as a backlight light source, the present invention can also be applied to other display apparatuses that have a display panel other than an LCD panel and a light source device as a backlight light source.

It should be understood by those skilled in the art that various modifications, combinations, sub-combinations and alterations may occur depending on design requirements and other factors insofar as they are within the scope of the appended claims or the equivalents thereof.

What is claimed is:

1. A light source device for a display panel, comprising:
a light-emitting unit;
an optical sheet disposed between the light-emitting unit and the display panel;
a support portion that supports at least an edge of the optical sheet; and
an optical member at least partially disposed between the support portion and the optical sheet, the optical member having a reflectivity that is higher than that of the support portion with respect to light emitted from the light-emitting unit, wherein, in the region corresponding to the non-display region of the display panel, the optical member is disposed so as to additionally cover a surface of the optical sheet that faces away from the light-emitting unit.

2. The light source device according to claim 1, wherein, in a region corresponding to a non-display region of the display panel, the optical member is disposed so as to cover a side surface of the optical sheet and a surface of the optical sheet that faces towards the light-emitting unit.

3. The light source device according to claim 1, wherein the optical member includes a plurality of optical members that are disposed at four corners of a peripheral region of the display panel.

4. The light source device according to claim 1, wherein the optical member is disposed along an entire peripheral region of the display panel.

5. The light source device according to claim 1, wherein the optical member is disposed on a surface of the support portion that is proximate to the optical sheet.

6. The light source device according to claim 1, wherein a surface of the optical member that is proximate to the optical sheet is a mirror surface.

7. The light source device according to claim 1, wherein a surface of the optical member that is proximate to the optical sheet is a diffuse reflector.

8. The light source device according to claim 1, wherein a surface of the optical member that is proximate to the optical sheet includes a material containing aluminum or silver.

9. The light source device according to claim 1, wherein the light source device is of a direct lighting type in which the light-emitting unit is disposed below the display panel and the optical sheet.

10. The light source device according to claim 1, wherein the light source device has light emitting elements and the light source device including a light-guiding portion that guides the light emitted from the light-emitting elements towards the optical sheet.

11. The light source device according to claim 1, wherein the light-emitting unit includes a light-emitting diode.

12. The light source device according to claim 1, wherein the light-emitting unit includes a cold cathode fluorescent lamp.

13. A display apparatus comprising:
a display panel; and
a light source device for the display panel,
wherein the light source device includes
a light-emitting unit,
an optical sheet disposed between the light-emitting unit and the display panel,
a support portion that supports an edge of the display panel and an edge of the optical sheet, and
an optical member at least partially disposed between the support portion and the optical sheet, the optical member having a reflectivity that is higher than that of the support portion with respect to light emitted from the light-emitting unit wherein, in the region corresponding to the non-display region of the display panel, the optical member is disposed so as to additionally cover a surface of the optical sheet.

* * * * *